(No Model.)
J. C. HENDERSON.
SAFETY DEVICE FOR RELIEVING EXCESSIVE PRESSURE.
No. 568,680. Patented Sept. 29, 1896.
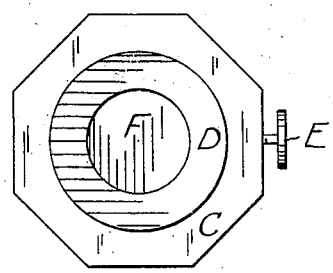
Fig. 1
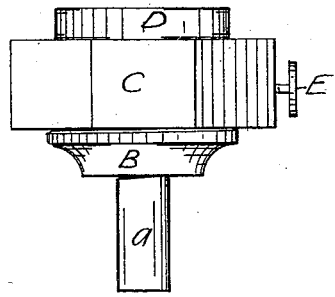
Fig. 2
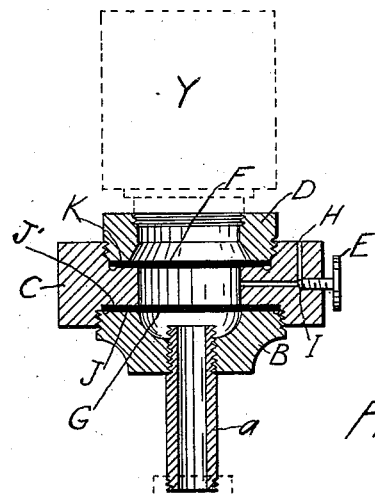
Fig. 3.
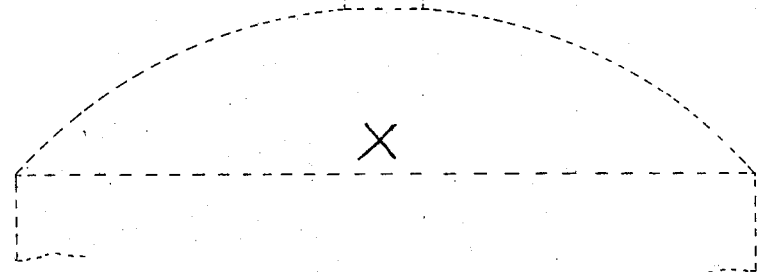
WITNESSES:
J. T. Kinesteel
Albert E. Alexander
INVENTOR
John C. Henderson
BY
James R. Rogers
ATTORNEY.

UNITED STATES PATENT OFFICE.

JOHN C. HENDERSON, OF NEW YORK, N. Y., ASSIGNOR TO THE AMERICAN MOTOR COMPANY, JOHN C. SCOTT, PRESIDENT AND TRUSTEE, OF SAME PLACE.

SAFETY DEVICE FOR RELIEVING EXCESSIVE PRESSURES.

SPECIFICATION forming part of Letters Patent No. 568,680, dated September 29, 1896.

Application filed December 27, 1895. Serial No. 573,515. (No model.)

*To all whom it may concern:*

Be it known that I, JOHN C. HENDERSON, a citizen of the United States, residing at New York, in the county of New York and State of New York, have invented certain new and useful Improvements in Safety Devices for Relieving Excessive Pressures; and I do hereby declare the following to be a full, clear, and exact description of the invention, such as will enable others skilled in the art to which it appertains to make and use the same.

My invention relates to improvements in safety devices for relieving excessive pressures, attached to and operated in connection with cylinders, pipes, chambers, or other vessels containing liquids, gases, or vapors; and the objects of my improvement are to provide means whereby the loss of the material used is overcome, the expense incident to the loss of material lessened, reduced to the minimum, and the inconvenience occasioned thereby obviated. I attain these objects by the construction illustrated in the accompanying drawings, in which—

Figure 1 is a top plan view. Fig. 2 is a side view in elevation; and Fig. 3 is a longitudinal sectional view showing the interior of the device with the two diaphragms in position and cylinders connected thereto.

Similar letters refer to similar parts throughout the several views.

A is a nipple or pipe screwed into or otherwise attached to the vessel containing the liquid, vapor, or gas under pressure.

B is a chambered plate screwed into or otherwise attached to the nipple A, having a diaphragm G, of any suitable material, such as metal, and having a certain known bursting limit, kept in place upon the upper face J of the plate B and against the lower face J' of the nut C, which is screw-threaded to fit tightly upon the upper end of the chambered plate B, thereby making a tight joint between the two surfaces of the diaphragm G, the upper face of the plate B, and the lower face of the nut C. On the upper part of the nut C is a screw-threaded recess similar to that into which the chambered plate B is screwed, and into the said recess of nut C the ring or bushing D, screw-threaded on its outer and lower end, is firmly screwed. After the diaphragm F has been placed into the bottom of the said recess the ring or bushing D is screwed therein, whereby the diaphragm F is clamped between the lower face of the ring or bushing D and the upper face of the recess in the upper portion of the nut C, thus forming a tight joint between the face of the ring or bushing and the diaphragm F.

K is the tight joint between the diaphragm F and the ring or bushing D.

Extending radially from the outer face of the nut C into the recess therein, between the two diaphragms F and G, is a small hole I, the outer end of which is tapped for the valve E, and at right angles to which, extending upward through and to the face of the nut, is the opening H.

The operation may be easily understood from the construction hereinbefore described. Diaphragms of definite and known bursting strain are placed into position as shown and described, and the device, by means of the nipple A, is screwed into or otherwise attached to the vessel or cylinder X to be protected, and the valve E is opened. When the pressure is increased sufficiently to rupture the diaphragm G, the relief given by the space between the diaphragms G and F, together with the small aperture H, communicating with the atmosphere, will prevent the rupture of the diaphragm F, and at the same time the escaping gas, vapor, or liquid will call the attention of the attendant to the ruptured diaphragm G. The attendant by shutting off the valve E thereby prevents further waste of the material employed in the storing vessel X until a new diaphragm G can be replaced. The valve E may be made to operate automatically, thereby obviating the expense of an attendant. A waste-cylinder Y may be attached to the ring or bushing D by means of screw-threads or otherwise in order that a larger porportion of the material used be recovered when both diaphragms F and G are ruptured in quick succession.

Having fully described my invention, what I claim, and desire to secure by Letters Patent, is—

1. In safety devices for relieving excessive pressures, the hollow nut, C, the plate, B, the nipple, A, attached thereto, adapted to be secured to a cylinder or storing vessel, the said hollow nut, provided with an opening, communicating with the outside atmosphere, and the valve, E, located in said opening, and the diaphragm, G, clamped between the said nut, C, and plate, B, substantially as herein shown and described.

2. In safety devices for relieving excessive pressures, the recessed nut, C, containing a valve-controlled channel extending to the atmosphere the plate, B, the pipe, A, the diaphragm, G, in combination with a storing vessel or cylinder, X, substantially as herein shown and described.

3. In devices for relieving excessive pressures, the recessed nut, C, the plate, B, the pipe, A, the diaphragms, F G, valve, E, in combination with the storing vessel, X, and waste-cylinder, Y, substantially as herein shown and described.

4. In safety devices for relieving excessive pressures the double-shouldered, hollow nut, C, the plate, B, screwed into the same, the nipple, A, secured thereto, the diaphragm, G, located between the nut, C and the plate, B, the said nut, C, provided with an opening connecting the interior thereof with the exterior atmosphere, the outlet thereof tapped by the valve, E, the diaphragm, F, the ring, D, screwed into said shouldered nut, C, on the upper face thereof and clamping the diaphragm, F, to nut, C, in combination with the cylinders, X, Y, substantially as herein shown and described.

In testimony whereof I affix my signature in presence of two witnesses.

JOHN C. HENDERSON.

Witnesses:
 JOHN F. LANGAN,
 G. DE WITT WILLIAMSON.